(12) United States Patent
Lapkowski

(10) Patent No.: US 7,418,698 B2
(45) Date of Patent: Aug. 26, 2008

(54) PAIRING OF SPILLS FOR PARALLEL REGISTERS

(75) Inventor: Christopher Lapkowski, Calgary (CA)

(73) Assignee: International Business Machines Corporation, Armonk, NY (US)

( * ) Notice: Subject to any disclaimer, the term of this patent is extended or adjusted under 35 U.S.C. 154(b) by 611 days.

(21) Appl. No.: 10/763,512

(22) Filed: Jan. 23, 2004

(65) Prior Publication Data

US 2005/0005267 A1 Jan. 6, 2005

(30) Foreign Application Priority Data

Jul. 3, 2003 (CA) .................................... 2434257

(51) Int. Cl.
*G06F 9/45* (2006.01)
(52) U.S. Cl. .................................... 717/149
(58) Field of Classification Search ......... 717/151–156, 717/144, 158, 149; 712/215–218, 24, 228, 712/28–30; 713/100
See application file for complete search history.

(56) References Cited

U.S. PATENT DOCUMENTS

| | | | |
|---|---|---|---|
| 5,249,295 A | 9/1993 | Briggs et al. | |
| 5,530,866 A | 6/1996 | Koblenz et al. | |
| 5,583,805 A | 12/1996 | Elliott et al. | |
| 5,867,684 A * | 2/1999 | Kahle et al. | 712/218 |
| 5,867,711 A | 2/1999 | Subramanian et al. | |
| 5,946,491 A | 8/1999 | Aizikowitz et al. | |
| 6,314,513 B1 * | 11/2001 | Ross et al. | 712/228 |
| 6,665,793 B1 * | 12/2003 | Zahir et al. | 712/228 |

OTHER PUBLICATIONS

Kolson et al., 'A Method for Register Allocation to Loops in Multiple Register File Architectures', Proceedings of IPPP's 96, 1996, pp. 28-33.*
ACM Letters on Programming Languages and Systems, Coloring Register Pairs, Briggs et al, vol. 1, No. 1, Mar. 1992, pp. 3-13.
Register Allocation in Structured Programs, Kannan et al,1990.
TDB, Nov. 1995, "Limiting Lifetimes of Register Sequences to Improve Register Allocation" pp. 89-92.
TDB, Mar. 1986, "Register Allocation", pp. 4506-4513.
1997 IEEE, International Conference on Acoustics, Speech, and Signal Processing vol. 1 of V, W. Kreuzer et al, "Cooperative Register Assignment and Code Compaction for Digital Signal Processors with Irregular Datapaths" pp. 691-694.
Software-Practice and Experience vol. 26(8) 929-965, Aug. 1996, "D. Goodwin et al," Optimal and Near-optimal Global Register Allocation Using 0-1 Integer Programming.

* cited by examiner

*Primary Examiner*—Tuan Anh Vu
(74) *Attorney, Agent, or Firm*—DeLizio Gilliam, PLLC

(57) ABSTRACT

Embodiments of the present invention provide a design for handling register overflow in a CPU having parallel registers. In an embodiment, spill code generated by a registers allocator may be analyzed to identify register spill instructions that can be associated. Register spill instructions that can be associated may be rewritten as parallel spill instructions, and the corresponding register spills may be configured for storage into memory in a manner permitting them to be loaded back to the registers in parallel.

4 Claims, 4 Drawing Sheets

PAIRING OF SPILLS FOR PARALLEL REGISTERS

BACKGROUND OF THE INVENTION

The present invention relates generally to data processing systems, and more specifically to handling overflow from registers.

As known to those skilled in the art, in central processing unit ("CPU") architectures, registers are used to temporarily store and manipulate values using arithmetic instructions. Coded instructions to be executed on the CPU, and which may store and manipulate values on the registers and read values from the registers, must first be compiled. During a typical compilation process, a compiler is free to use a virtually unlimited number of symbolic registers. At the tail end of a compilation process, a register allocator may be used to map the symbolic registers onto the real, architected registers. When there are too many symbolic registers to be allocated to the real registers in a cycle, the overflow of symbolic registers may be temporarily stored in memory. This overflow to memory is commonly known as "spilling", and the location to which the overflow is made may be referred to as a "spill". To accomplish this spilling to memory, a register allocator will insert a store to spill ("store") instruction in a "spill code". When the stored data is needed again, the register allocator inserts a load from spill ("load") instruction in the "spill code" to load the symbolic register back into an available register location. ("Spill code" typically may be found dispersed within a larger body of processor code commonly known as "procedure code".)

While spilling designs for single registers are well known, effective designs for a CPU architecture having parallel registers are less apparent. A new design for handling the storing and loading of spills in a CPU architecture having parallel registers would be desirable.

SUMMARY OF THE INVENTION

The present invention provides a design for handling register overflow in a CPU architecture having parallel registers.

In an embodiment, "spill code" generated by a register allocator may be analyzed to identify register spill instructions (i.e. load from spill and store to spill instructions) that can be associated. Register spill instructions that can be associated may be rewritten as parallel spill instructions, and the corresponding symbolic registers may be stored into memory in a manner permitting them to be loaded back again to the registers in parallel.

In an embodiment, a register allocator of a compiler may utilize intermediate spill instructions to generate spill code for spilling registers to spill locations identified by a numeric identifier or ID. After generation of the spill code is complete, the spill code may be analyzed, starting with the basic blocks in the spill code estimated to execute most frequently.

In an embodiment, two store instructions, or two load instructions may be analyzed within a basic block of the spill code. If the register locations for these instructions are aligned, and it is possible to move the instructions together, then the corresponding spill IDs may be paired, and the store or load instructions may be rewritten as one intermediate parallel store or parallel load instruction.

After analyzing the entire spill code, the spill IDs may be mapped to memory on a procedure's stack frame for storage. In an embodiment, all paired spill IDs may be allocated space on the memory stack first, so that the double word aligned paired spill IDs do not waste space due to alignment. (As will be appreciated by those skilled in the art, the double word aligned paired spill IDs should be stored starting at an address location divisible by their double word length. Due to this restriction, if single word spill IDs are intermixed with double word spill IDs, a significant waste of memory space may result.) After the paired spill IDs, the remaining spill locations may be allocated space on the memory stack. Advantageously, improved register performance may be achieved by utilizing parallel store/parallel load instructions.

In an aspect of the invention, there is provided a method of handling register spills in a CPU having parallel registers, comprising:
(i) determining that register spill instructions in spill code generated by a register allocator can be associated with each other;
(ii) based on the determining, rewriting said register spill instructions as a parallel register spill instruction; and
(iii) based on said rewritten parallel register spill instruction, configuring storage of associated register spills in memory in such a manner that said register spills can be loaded back into said registers in parallel.

In an embodiment of said first aspect of the invention, said CPU comprises a first register set and a second register set, and (i) comprises determining that two register spill instructions can be paired.

In another embodiment of said first aspect of the invention, (i) includes determining that two register spill instructions are in a basic block within said spill code.

In another embodiment of said first aspect of the invention, (i) includes determining that said register spill instructions relate to matching register locations in each of a first register set and a second register set.

In another embodiment of said first aspect of the invention, (i) includes determining that no intervening instructions between said register spill instructions modify any of said register spill instructions.

In another embodiment of said first aspect of the invention, (iii) includes first allocating space on a memory stack to all paired register spills, then allocating space on a memory stack for any remaining register spills.

In another embodiment of said first aspect of the invention, (iii) includes allocating space on a memory stack such that paired register spills are double word aligned.

In another embodiment of said first aspect of the invention, the method further comprising loading said paired register spill instructions from said memory stack back into matching register locations in each of said first register set and said second register set in parallel.

In another aspect of the invention, there is provided a system for handling register spills in a CPU having parallel registers, comprising:
(a) an analyzer module configured to analyze spill code generated by a register allocator to determine whether that register spill instructions can be associated with each other;
(b) a rewriter module configured to, based on the determining, rewrite said register spill instructions as a parallel register spill instruction; and
(c) a storage module configured to configure storage of associated register spills in memory in such a manner that said register spills can be loaded back into said registers in parallel based on said rewritten parallel register spill instruction.

In another aspect of the invention, there is provided a system for handling register spills in a CPU having parallel registers, comprising:

(a) means for determining that register spill instructions in spill code generated by a register allocator can be associated with each other;
(b) means for, based on the determining, rewriting said register spill instructions as a parallel register spill instruction;
(c) means for configuring, based on said rewritten parallel register spill instruction, storage of associated register spills in memory in such a manner that said register spills can be loaded back into said registers in parallel.

In another aspect of the invention, there is provided a computer readable medium having computer readable program code embedded in the medium for handling register spills in a CPU having parallel registers, the computer readable program code comprising including:
(i) code for determining that register spill instructions in spill code generated by a register allocator can be associated with each other;
(ii) code for rewriting, based on the determining, said register spill instructions as a parallel register spill instruction;
(iii) code for configuring, based on said rewritten parallel register spill instruction, storage of associated register spills in memory in such a manner that said register spills can be loaded back into said registers in parallel.

The foregoing and other aspects of the invention will be apparent from the following more particular descriptions of exemplary embodiments of the invention.

BRIEF DESCRIPTION OF THE DRAWINGS

In the figures which illustrate exemplary embodiments of the invention.

DETAILED DESCRIPTION OF EXEMPLARY EMBODIMENTS

Figure 1:
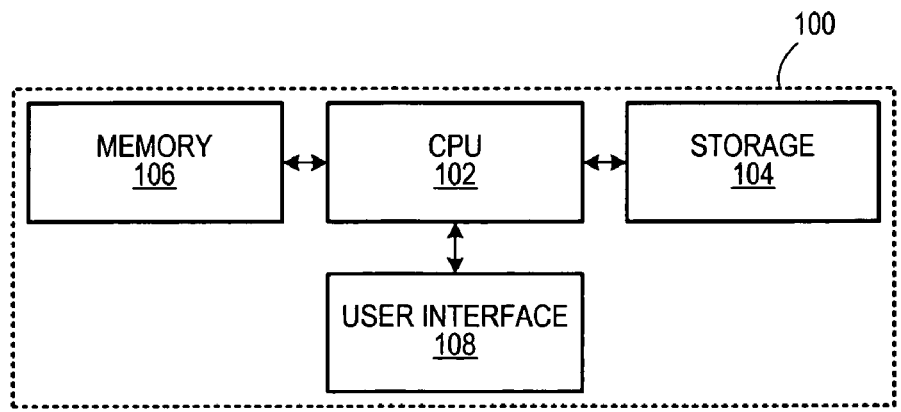
FIG. 1 is a schematic block diagram of a generic data processing system.

Referring to FIG. 1, a generic data processing system 100 is shown which may provide an operating environment for exemplary embodiments of the invention. The data processing system 100 may include, for example, a CPU 102 operatively connected to a storage 104, memory 106, and a user interface 108.

Figure 2:
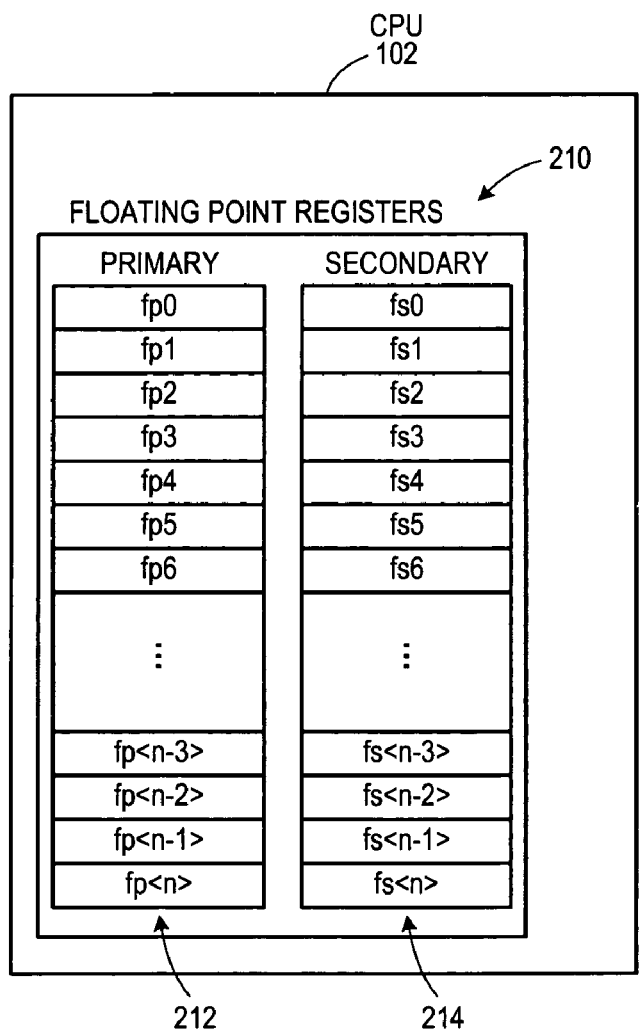
FIG. 2 is a schematic block diagram of an illustrative CPU register architecture which may provide an operating environment for exemplary embodiments of the invention.

Referring to FIG. 2, shown is a schematic block diagram of an illustrative CPU register architecture which may be found in the CPU 102 of FIG. 1. As shown in FIG. 2, the CPU 102 may include registers 210. For example, the registers may be floating point registers and may include a primary floating point register set 212, and a secondary floating point register set 214. In an exemplary embodiment, the first floating point register set 212 may have locations numbered from "fp0" through "fp<n>", and the second floating point register set 214 may have locations numbered from "fs0" to "fs<n>" (where <n> is the last numbered architected register).

In an exemplary embodiment, a standard instruction set may operate on a first register file associated with the first floating point register set 212. A subset of this standard instruction set may be adapted to access a second register file associated with the second floating point register set 212.

In an exemplary embodiment, an instruction set may be defined which may operate on both the first and second register files at the same time. As will be appreciated by those skilled in the art, such computations may facilitate complex arithmetic operations or other two value parallel computations in the computer architecture with parallel registers of FIG. 2.

As an illustrative example, consider load and store operations on the first and second floating point registers 212, 214 of FIG. 2.

In an exemplary embodiment, a standard load instruction may be notated as, for example, "LFL fpX=memory( ... )" where the memory location is specified with a base, index and displacement. In an illustrative example, the CPU 102 may have a performance restriction which requires that the effective address be "8 byte aligned" for floating [−1]point values (where the 8 bytes represent one "floating point word"). Similarly, a store instruction may be notated as, for example, "STFL memory( ... )=fpX".

Equivalent load/store instructions are then required for the secondary floating point registers 214. These instructions may be notated as, for example, "LSFL fsX=memory( ... )" and "STSFL memory( ... )=fsX", and may manipulate the secondary register file associated with the secondary floating point registers 214.

To take advantage of a CPU architecture having parallel registers, e.g. as shown in FIG. 2, new instructions may be utilized that manipulate registers in both the first and second register files at the same time. For example, an "add parallel" instruction notated as "APFL fpX,fsX=fpY,fsY,fpZ,fsZ" may add fpY to fpZ and store the result in fpX and, in parallel, add fsY to fsZ and store the result in fsX. A parallel load from spill ("parallel load") instruction notated as, for example, "LPFL fpX,fsX=memory( ... )" may then load fpX from 8 bytes starting at the effective address and, in parallel, load fsX from the 8 bytes following. As will be appreciated by those skilled in the art, in this CPU architecture having parallel registers, there may be performance implications if the effective address is not 16 byte aligned (i.e., "double floating point word" aligned).

In an embodiment, parallel instructions may operate on matching register locations in the first and second register files. For example, if it is desired to load a value into register 3 of the first register file (i.e., fp3) then loading of another value into register 3 of the second register file (i.e., fs3) should be considered. One skilled in the art of register architecture design will be aware of the limitation of space when encoding computer instructions. As a result of having, perhaps, only room for 2 or 3 operands in the instruction encoding, it will be appreciated by those skilled in the art that parallel instructions should use matching register locations.

Provided a CPU architecture having parallel registers, such as shown in the illustrative example of FIG. 2, a compiler can take advantage of the parallel registers by utilizing parallel load/parallel store instructions, if possible. In an embodiment, paired load/store instructions may be rewritten into an intermediate representation such that the compiler can allocate both first and second registers in such a way that parallel instructions use the same register locations. To achieve this, a compiler may use the same symbolic register set that is twice the size of a regular symbolic register for both first and second registers. Thus, for example, parallel instructions such as a "load paralle" instruction may be notated as "LPFL fpA, fpB=memory( ... )". It is then the task of a register allocator to allocate fpA and fpB such that they act as an aligned register pair and represent matching first second registers fpX and fsX. For example, one possible process by which the register allocator can do this is described by Briggs et al. in their paper entitled "Coloring Register Pairs", ACM Letters on Programming Languages and Systems, Vol. 1. March 1992, pp. 3-13, which is incorporated herein by reference. In the present exemplary embodiment, two separate register sets (i.e. first and second) are used.

Continuing with a description of the exemplary embodiment, during register allocation by the register allocator, "spilling" may occur. For example, the register allocator may be configured to issue spill instructions using intermediate instructions, such as: "STSPILL fpX,locN" and "STSPILL fsY,locM", where fpX and fsY are registers in each of the first register set 212 and second register set 214, respectively, and locN and locM are numeric spill location identifiers. As will be appreciated by those skilled in the art, the advantage of using such intermediate instructions is that analysis of the spill code may be performed more easily by avoiding confusion with other load and store instructions in the code. Also, by using such intermediate spill instructions, the laying out of spill locations in memory may be delayed, permitting further optimizations of spill code[-2], or the pairing of spills for parallel load/parallel store If spill code has been introduced during the register allocation process, it is desirable to reduce the cost of performing the storing and loading of spill data to/from memory. Provided a CPU register architecture that is capable of loading or storing values in parallel, such as is shown in the illustrative example of FIG. 2, it is possible to improve register and CPU performance by trying to use parallel loads and stores for spilling where possible.

An illustrative method in accordance with an exemplary embodiment of the invention is now described.

Referring to FIGS. 3A-3D, shown is a method 300 in accordance with an embodiment of the invention. Method 300 begins at block 302 at which, during a compilation process, a register allocator uses intermediate spill instructions to spill symbolic registers to spill locations identified by a numeric identifier (ID).

Method 300 proceeds to decision block 304 at which method 300 queries whether the spilling has completed. If no, method 300 returns to block 302 to continue register allocation. If yes, method 300 proceeds to block 306 at which the spill code is analyzed, starting with the basic blocks estimated to execute most frequently. For example, this may be determined based on the nesting level or profile directed feedback (PDF) information. (As will be familiar to those skilled in the art, PDF uses sample input to collect statistics on which parts of a program execute most frequently. Optimization efforts are then focused on the more frequently executed code. This optimization technique requires recompiling the program after statistics have been collected.)

At block 308, in an embodiment, method 300 may consider spill instructions and load instructions within each basic block. One possible embodiment of block 302 is shown in further detail in FIG. 3B. At block 308a, for example, a first load/store instruction of the form "fpX,locN" may be read. Order is not important, but one instruction is accessing the first register set 212 and the other is accessing the second register set 214. At block 308b, a second load/store instruction in the form"fsY,locM" may be read. At decision block 308c, method 308 queries whether X=Y (i.e., whether the registers being referenced in each of the first and second registers match). If no, method 308 proceeds to block 308h where it is noted that parallel load/store may not be used. If yes, method 308 proceeds to decision block 308d. At block 302d, method 302 queries whether there are any intervening instructions between the first and second load/store instructions read at block 308a and block 308b, respectively.

If no, method 308 proceeds to block 308g at which it is noted that a parallel load/store may be possible. Method 308 then ends.

If yes, method 308 proceeds to decision block 308e. At block 308e, method 308 queries whether the register or memory locations of the spill instructions under consideration are modified by any intervening instructions. Such intervening instructions may prevent relocation of one or both spill instructions under consideration due to unintended changes in semantics which may result. This will be well understood by those skilled in the art. Consequently, if there are any such modifications by the intervening instructions, method 308 proceeds to block 308h. Otherwise, method 308 proceeds to block 308g.

Returning to FIG. 3A, method 300 proceeds to decision block 310, at which method 300 queries whether a parallel load/store is possible (as determined at block 308). If yes, method 300 proceeds to block 312. If no, method 300 bypasses block 312 and proceeds directly to decision block 313.

Figure 3A:
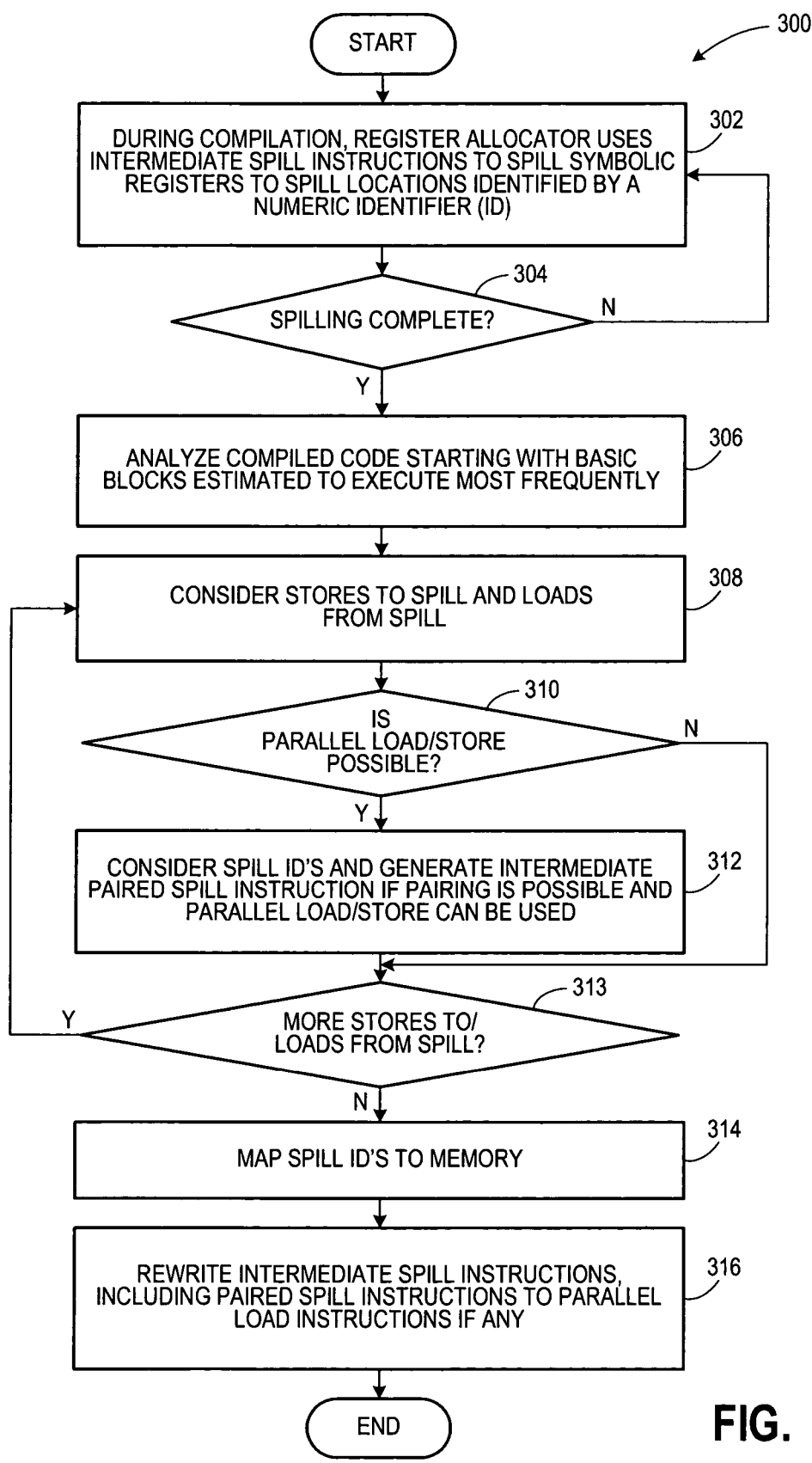
FIGS. 3A-3D are schematic flow charts of a method in accordance with an exemplary embodiment.
Figure 3B:
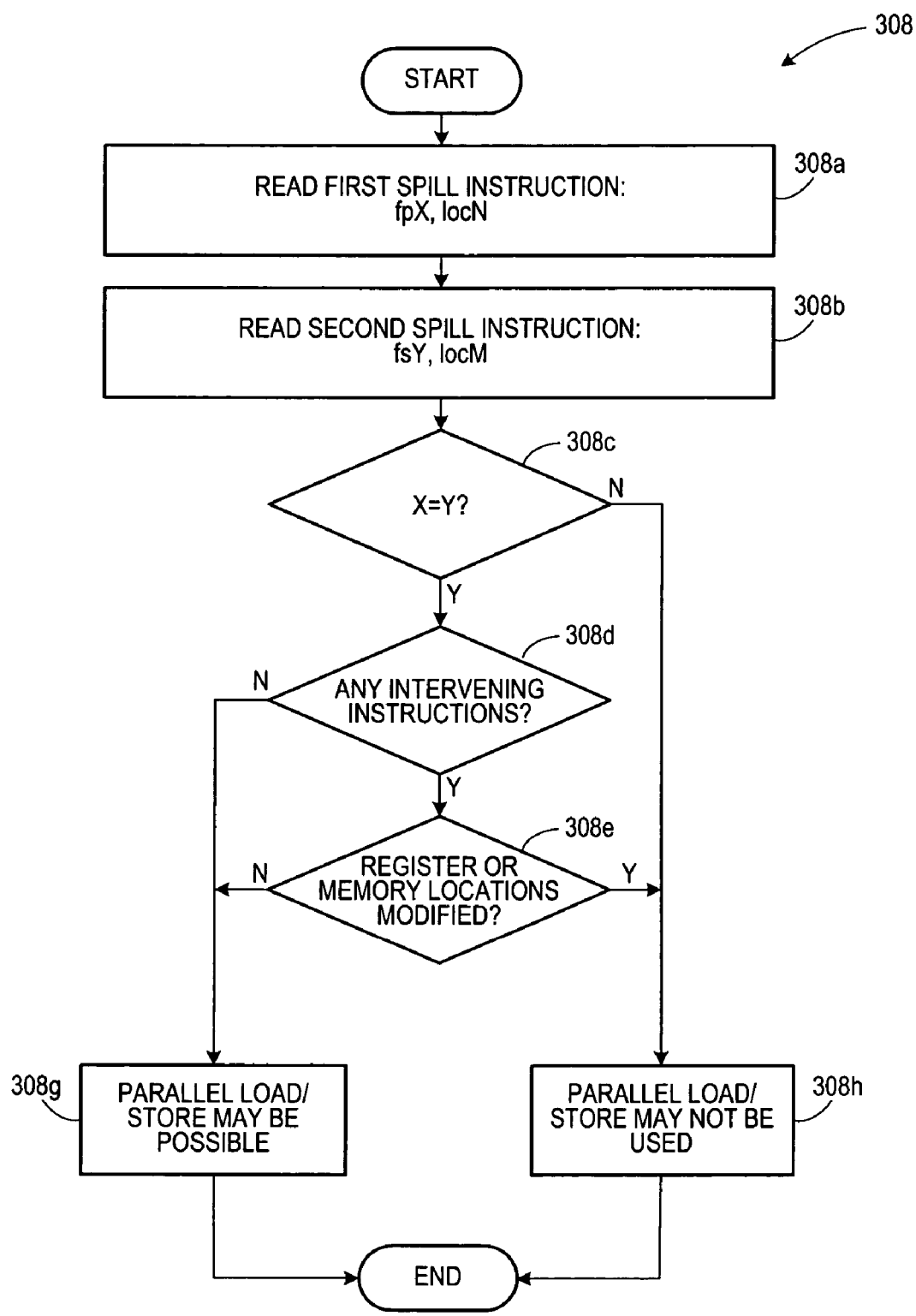
Figure 3C:
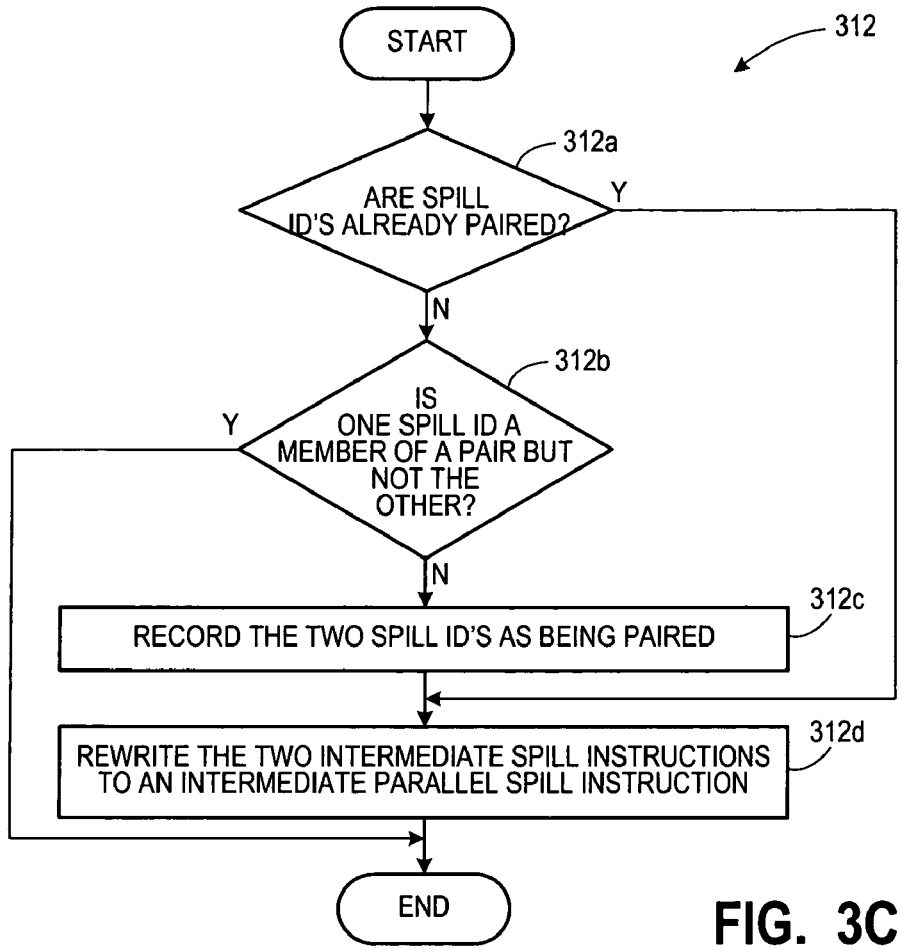

At block 312, method 300 considers the spill IDs of the load/store instructions and, if pairing is possible and parallel load/store can be used, generates an intermediate parallel load/store spill instruction. Block 312 is shown in further detail in FIG. 3C. As shown in FIG. 3C, at block 312a, method 312 queries whether the spill IDs are already paired. If yes, method 312 proceeds directly to block 312d, at which the two intermediate spill instructions may be rewritten as one intermediate parallel load/store instruction. If no, method 312 proceeds to decision block 312b. At block 312b, method 312 queries whether one spill is a member of a pair but the other is not. If yes, a parallel load/store is not possible, as this would make one of the pair not aligned in memory. If no, method 312 proceeds to block 312c, at which the two spill IDs are recognized as being paired. Method 312 then proceeds to block 312d where the two intermediate load/store spill instructions are rewritten as one intermediate parallel load/store spill instruction. Method 312 then ends, and proceeds to decision block 313 (FIG. 3A).

At decision block 313, method 300 considers whether there are any further stores to spill or loads from spill to be considered in the basic block being analyzed. If yes, then method 300 returns to block 308 to consider further store to spill or load from spill instructions. If no, then method 300 proceeds to block 314.

Figure 3D:
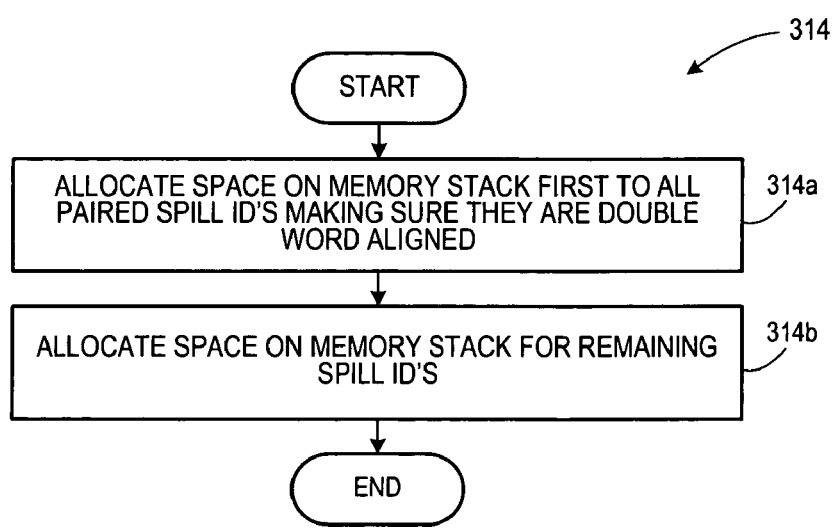

At block 314, the spill IDs are mapped to memory. As shown in FIG. 3D, at block 314a, space on the memory stack may be first allocated to all paired spill IDs, making sure that they are double word aligned. Then, at block 314b, space on the memory stack is allocated for the remaining spill IDs. Method 314 then ends.

Returning to FIG. 3A, method 300 then proceeds to block 316, at which intermediate load/store spill instructions are rewritten to actual load/store instructions. Parallel intermediate load/store spill instructions are rewritten as actual parallel load/store instructions, and intermediate single load/store instructions are rewritten as actual single load/store instructions. Method 300 then ends.

As will be appreciated by those skilled in the art, the exemplary method 300 as described above may provide improved efficiency in utilizing parallel registers such as is shown in FIG. 2, and result in improved CPU performance.

It will be appreciated that the exemplary embodiment as detailed above is but one possible design, and that various changes and modifications may be made to the embodiment described.

For example, while parallel floating point registers have been described, it will be appreciated by those skilled in the art that the teachings of the present invention may be readily extended to parallel general purpose registers.

Furthermore, it will be appreciated by those skilled in the art that it is possible to extend the parallel load/store concept to more than two registers.

Therefore, the scope of the invention is limited only by the language of the following claims.

What is claimed is:

1. A method of handling register spills in a CPU having parallel registers, said parallel registers including a first register set and a second register set, the method comprising:
   (i) determining that register spill instructions in spill code generated by a register allocator can be paired, wherein paired register spill instructions relate to corresponding register locations in each of the first register set and the second register set and that no instructions between said register spill instructions modify any of said register spill instructions;
   (ii) based on determining, modifying said register spill instructions as a parallel register spill instruction; and
   (iii) based on said modified parallel register spill instruction, configuring storage of associated register spills in memory in such a manner that said register spills can be loaded into said first and second register sets in parallel, wherein the configuring includes allocating space on a memory stack such that paired register spills are double word aligned.

2. The method of claim 1, wherein (i) includes determining that said register spill instructions are in a basic block within said spill code.

3. The method of claim 1, wherein (iii) includes allocating space on said memory stack for any remaining register spills.

4. The method of claim 1, further comprising loading said paired register spills from said memory stack back into corresponding register locations in each of said first register set and said second register set in parallel.

* * * * *